UNITED STATES PATENT OFFICE.

GEORGE S. GORDON, OF NEW YORK, N. Y.

CANDY PRODUCT AND PROCESS OF MAKING SAME.

1,063,533. Specification of Letters Patent. Patented June 3, 1913.

No Drawing. Application filed October 31, 1912. Serial No. 728,784.

*To all whom it may concern:*

Be it known that I, GEORGE S. GORDON, a subject of the Czar of Russia, residing at New York city, Manhattan borough, county and State of New York, have invented certain new and useful Improvements in Candy Products and Processes of Making Same, of which the following is a full, clear, and exact description.

My improvement relates to a candy product, more particularly a Turkish sweetmeat known as "halvah," and has for its object to improve the process of making the same and to produce a palatable sweetmeat of this character at a minimum cost.

I will now proceed to describe in detail my improved process of producing the aforesaid sweetmeat, the novel features of which will be pointed out in the appended claims.

In manufacturing my improved product in accordance with my process, to make up (for example) a quantity of approximately one hundred pounds, I take about thirty-five pounds of corn syrup and fifteen pounds of granulated sugar and boil the same until the same becomes of a pasty or mushy consistency. In the initial stage of the boiling I add about two pints syrup of Turkish soap-root (*Gypsophila struthium* or *Gypsophila paniculata, prod. radix saponariæ Turcicæ*), the object of the soap-root being to render the product more white and to give it greater consistency or viscosity. In other words, the aforesaid root acts to whiten or bleach what would otherwise be a yellowish product. I thereupon add to the mixture approximately fifty pounds of specially prepared peanut butter, as hereinafter set forth. I then add a very small quantity, say about half a teaspoonful of a suitable flavoring essence. The compound is then thoroughly mixed in a kneading machine for about twenty minutes until it is of suitable thickness or consistency to be cut into cakes for packaging.

I preferably prepare the peanut butter which I use as above described by taking the desired quantity of peanuts and roasting the same until they are practically free of moisture, but the roasting is continued only so long that the nuts will remain white and so that the oil therein is not affected by excessive roasting. I then grind the nuts until they become in a pasty or mushy condition; in other words, the peanut mush or butter used in the manufacture of my sweetmeat should be white and not of the yellowish color usual in peanut butter now on the market.

Having now described my invention, what I claim and desire to secure by Letters Patent is:

1. A sweetmeat consisting of about 35% corn syrup, 15% granulated sugar, 50% of a whitish peanut butter and a flavoring essence.

2. A bleached sweetmeat compound, composed of approximately 35% corn syrup, 15% granulated sugar, and 50% of a whitish peanut butter.

3. The herein described process of producing a sweetmeat, which consists in first boiling approximately 35% of corn syrup and 15% of granulated sugar to a pasty or mushy consistency; then adding thereto, during the boiling, a vegetable bleaching agent; thereupon adding to the mixture approximately 50% of slightly roasted ground peanuts, and finally kneading the mixture, as herein set forth.

Signed at New York city, N. Y., this 29 day of October, 1912.

GEORGE S. GORDON.

Witnesses:
EDWARD A. JARVIS,
MAURICE BLOCK.